United States Patent [19]

Wicker, Jr. et al.

[11] Patent Number: 5,972,049
[45] Date of Patent: Oct. 26, 1999

[54] CLAY-CONTAINING DISPERSING COMPOSITION FOR CARRIERS USED IN THE DISPERSE DYEING OF HYDROPHOBIC TEXTILES

[75] Inventors: Calvin M. Wicker, Jr., Spartanburg, S.C.; Otto Bello, Tryon, N.C.; Ricky C. Phillips, Cowpens; Robert B. Login, Simpsonville, both of S.C.

[73] Assignee: Sybron Chemicals Inc., Birmingham, N.J.

[21] Appl. No.: 09/014,882

[22] Filed: Jan. 28, 1998

[51] Int. Cl.⁶ .................................................. C07B 67/40
[52] U.S. Cl. .......................... 8/574; 8/625; 8/628; 8/632; 8/501; 8/527; 106/632; 106/634; 252/351; 252/352; 252/363.5
[58] Field of Search .................................. 8/625, 628, 632, 8/574, 501, 527; 106/632, 634; 252/351, 352, 363.5

[56] References Cited

U.S. PATENT DOCUMENTS

| | | |
|---|---|---|
| 3,427,119 | 2/1969 | Dehnert et al. . |
| 3,574,513 | 4/1971 | Wolf et al. . |
| 3,594,111 | 7/1971 | Witcoff et al. . |
| 3,594,212 | 7/1971 | Ditch . |
| 3,597,304 | 8/1971 | Baldwin et al. . |
| 3,619,357 | 11/1971 | Keen . |
| 3,707,347 | 12/1972 | Mueller . |
| 3,886,075 | 5/1975 | Bernardino . |
| 3,989,631 | 11/1976 | Marsan . |
| 3,993,573 | 11/1976 | Gloss . |
| 4,032,291 | 6/1977 | Dellian . |
| 4,055,248 | 10/1977 | Marsan . |
| 4,059,516 | 11/1977 | Heisey . |
| 4,073,996 | 2/1978 | Bednek et al. . |
| 4,178,254 | 12/1979 | Leikhim et al. . |
| 4,386,010 | 5/1983 | Hilebrandt . |
| 4,469,605 | 9/1984 | Ramachandran et al. . |
| 4,549,966 | 10/1985 | Beall . |
| 4,639,480 | 1/1987 | Birum et al. ............................ 524/104 |
| 4,715,969 | 12/1987 | Rothanavibhata et al. . |
| 4,740,488 | 4/1988 | Fogler et al. . |
| 4,767,546 | 8/1988 | Weinstein . |
| 4,780,105 | 10/1988 | White et al. . |
| 4,812,143 | 3/1989 | Hofmann et al. ............................ 8/528 |
| 4,814,095 | 3/1989 | Puchta et al. . |
| 4,844,821 | 7/1989 | Mermelstein et al. . |
| 4,994,089 | 2/1991 | Bartkowiak et al. . |
| 5,130,028 | 7/1992 | Cody et al. . |
| 5,151,155 | 9/1992 | Cody et al. . |
| 5,169,888 | 12/1992 | Sales . |
| 5,177,066 | 1/1993 | Shimohiro et al. . |
| 5,358,647 | 10/1994 | Puentes-Bravo et al. . |
| 5,376,283 | 12/1994 | Hooykaas . |
| 5,401,417 | 3/1995 | Dentel et al. . |
| 5,454,955 | 10/1995 | Albrecht et al. . |
| 5,500,151 | 3/1996 | Cao et al. . |
| 5,509,940 | 4/1996 | Zbar et al. . |
| 5,540,740 | 7/1996 | Yao et al. . |

FOREIGN PATENT DOCUMENTS 2247470  3/1992  United Kingdom .

OTHER PUBLICATIONS

Kirk–Othmer Encyclopedia of Chemical Technology, vol. 8, 3rd ed. pp. 151–153 (month unknown), 1979.

Fite, F.J., "Dyeing Polyester at Low temperatures: Kinetics of Dyeing with Disperse Dyes", *Textile Research Journal*, vol. 65, pp. 362–368 (1995). (month unknown).

*Ullman's Chemical Encyclopedia,* vol. A 26, §5.7 Dyeing Accelerants (Cariiers), pp. 283–284, (1975) (month unknown).

*Ullman's Chemical Encyclopedia,* vol. A 7, §§1–7 Clays, pp. 109–136, (1994) (month unknown).

*Kirk–Othmer Encyclopedia of Chemistry,* vol. 6, pp. 381–423 & vol. 8, pp. 712–715 (1989). (month unknown).

H. van Olphen, *Clay Colloid Chemistry,* pp. 182–183 (1991), (month unknown).

Peters, R.H., Textile Chemistry, Chapter 22—Carrier Dyeing, pp. 723–740 (1975). (month unknown).

Richardson, Louis L., "Use of Bleaching Clays", *Jour. of the Amer. Oil Chemists' Soc.,* vol. 55, pp. 777–780 (1978) (month unknown).

Patterson, H.B.W., "Bleaching Practices in Europe", *Jour. of the Amer. Oil Chemists' Soc.,* vol. 53, pp. 339–341 (1976). (month unknown).

*Primary Examiner*—Alan Diamond
*Attorney, Agent, or Firm*—Panitch Schwarze Jacobs & Nadel, P.C.

[57] ABSTRACT

Improvements in the disperse dyeing process for hydrophobic textiles by the use of novel dye carrier formulations are disclosed. The carrier composition for use in disperse dyeing of hydrophobic textile material preferably comprises an alkylphthalimide carrier component and a clay dispersing agent. Dye baths and methods of disperse dyeing of a hydrophobic textile material are also disclosed. The use of clay as a dispersing agent allows for the use of carrier compositions with reduced health and environmental hazards without adversely affecting dyeing characteristics.

19 Claims, No Drawings

CLAY-CONTAINING DISPERSING COMPOSITION FOR CARRIERS USED IN THE DISPERSE DYEING OF HYDROPHOBIC TEXTILES

BACKGROUND OF THE INVENTION

The invention relates to the use of smectite clays as dispersing agents for dye carriers in the dyeing of hydrophobic textiles.

Certain hydrophobic textiles such as polyester (polyethylene terephthalate, sometimes known as PET), triacetate and aramid textiles are difficult to dye with disperse dyes at temperatures below their glass transition temperatures ($T_g$). Adequate dyeing rates are achieved when the dyeing temperature exceeds $T_g$, and economic dyeing rates are achieved with high temperature dyeing (ca. 130° C.). Adequate rates of disperse dyeing of hydrophobic textiles at lower temperatures can be achieved by the use of dye carrier compounds, sometimes referred to as dye assistants or accelerants (referred to herein by the term "dye carrier" or "carrier component"). Dye carriers have an affinity for and an ability to swell or plasticize the textile fibers and may be visualized as "carrying" the dye into the fibers. Dye carriers are typically low molecular weight, aromatic, hydrophobic organic oils that facilitate the dyeing process by plasticizing the surfaces of the fibers so that dye molecules can penetrate more rapidly and at lower temperatures. Examples of popular compounds for use as dye carriers in dyeing polyester textile material include aromatic and halogenated aliphatic hydrocarbons and phenols, such as o-phenylphenol, diphenyl or chlorinated benzenes, alkylphthalimide compounds, biphenyl, and o-chlorotoluene.

Effective carrier compounds are insoluble in the aqueous dye bath and are added to the dye bath as emulsions with the aid of a dispersing agent. Effective dispersing systems for carrier compounds must perform two functions: (1) the function of maintaining the organic carrier dispersed in an aqueous solution; and (2) the function of allowing the organic carrier to come into contact with the surface of the fiber. For some dispersing agents, these functions may be at odds with each other in that a strong dispersing agent may partition the carrier oil into the aqueous phase, allowing reduced contact with the hydrophobic textile.

The use of carrier agents in disperse dyeing of textiles is well known, including the use of alkylphthalimides and derivatives thereof. See for example U.S. Pat. Nos. 3,574,513, 4,780,105 and 4,994,089, and British patent 2,247,470, granted Mar. 4, 1992.

Many of the commonly used dye carrier formulations present health and environmental risks. While the use of dye carriers such as alkylphthalimides would minimize these risks, as well as objectionable odor of some previous carriers, performance versus cost concerns with previous alkylphthalimide carrier formulations have resulted in their being underutilized in the industry. Therefore, there is a long felt need for dye carrier formulations which are more acceptable as concerns safety and which deliver effective, efficient performance in the dyeing process.

BRIEF SUMMARY OF THE INVENTION

The present invention allows for improvements in the disperse dyeing process for hydrophobic textiles, especially PET, by the use of novel dye carrier formulations.

One aspect of the invention relates to a carrier composition for use in disperse dyeing of an hydrophobic textile, the carrier composition comprising an alkylphthalimide carrier component and a clay dispersing agent.

Another aspect of the invention relates to a method of disperse dyeing a hydrophobic textile to a predetermined extent, the method comprising: (a) providing a hydrophobic textile, (b) providing an aqueous dye bath comprising a disperse dye and a dye carrier composition, the dye carrier composition comprising a dye carrier and a clay dispersing agent capable of dispersing the dye carrier in the dye bath, and (c) contacting the textile with the dye bath until the hydrophobic textile is dyed to the predetermined extent.

DETAILED DESCRIPTION OF THE INVENTION

It has been discovered, according to the present invention that smectite clays, especially bentonites, may be used as dispersing agents for carrier compounds in the disperse dyeing of hydrophobic textiles. The compositions and methods of the present invention have many advantages in the dyeing process. The odorless, nonvolatile carrier compositions of the present invention have environmental safety advantages, due to the inherently lower biochemical oxygen demand (BOD) and chemical oxygen demand (COD) associated with clays compared to organic chemical dispersants (emulsifiers). The carrier compositions of the present invention give enhanced dyeing yield and quality, such as more uniform dyeing. It is unexpected that there is substantially no spotting of this carrier, since such spotting can occur when using organic dispersants, due to separation of the carrier agent in the dye bath. In addition, the present invention allows the disperse dyeing to be conducted under atmospheric conditions and results in good yield. There is also no or minimal cross-staining of other, more hydrophilic fibers typically used in blends of different fibers.

"Hydrophobic textile", as used herein, means any textile material containing at least some yarns, filaments or fibers with a low affinity for water, including but not limited to, polyester, nylon, polypropylene, acrylic, polyurethane, triacetate, aramid (such as Kevlar® and Nomex®) and blends of such materials with each other or blends of such materials individually or together with other fibers such as cotton and wool. Hydrophobic textiles may be woven, nonwoven or knitted fabric, as well as yarns, fibers, or filaments, or other products made therefrom, such as carpeting, clothing, or any number of other finished goods.

The present invention may be used with any disperse dyes suitable for use in disperse dyeing hydrophobic textiles. A great many such dyes are known and they include virtually any color in the spectrum. See, for example, *The American Association of Textile Chemists and Colorists,* 1997, Buyers Guide, pp. 91–98. They are readily available from a number of commercial sources.

The dye carrier may be any compound which functions to enhance dye penetration of the hydrophobic textile. Dye carriers which may be used in accordance with this invention include, but are not limited to, orthophenylphenol, butyl cellosolve benzoate, butyl benzoate, biphenyl, orthochlorotoluene, trichlorobenzene and alkylphthalimides of both higher and lower molecular weight. Preferred as dye carriers in the present invention are phthalimide compounds and particularly alkylphthalimides.

One aspect of the invention relates to a carrier composition for use in disperse dyeing of hydrophobic textile, the composition comprising a dye carrier component and a clay dispersing agent.

The carrier composition of the present invention preferably contains as the carrier agent an alkylphthalimide carrier component. The use of a clay dispersing agent in conjunction with an alkylphthalimide carrier component has significantly and unexpectedly enhanced the performance of the alkylphthalimide carrier.

"Alkylphthalimide carrier component", as used herein, includes any alkylphthalimide compound or its functionally equivalent derivatives, or mixtures of such compounds, such as those disclosed, for example, in U.S. Pat. Nos. 3,574,513, 4,780,105 and 4,994,089, and British Patent 2,247,470, granted Mar. 4, 1992, the disclosures of which are hereby incorporated herein by reference. Other preferred phthalimide compounds are those having the following structural formula:

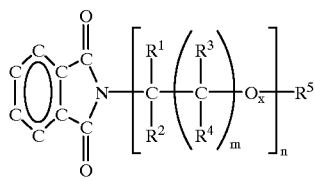

where $R^1$, $R^2$, $R^3$, $R^4$ and $R^5$ are independently H or alkyl groups of 1 to 3 carbon atoms, m is 0 or 1, n is 1 to 6 and x is 0 or 1.

Alkylpthalimide compounds may include N-substituted phthalimides which are substituted on the nitrogen by straight chain or branched chain alkyl radicals. Examples of alkylphthalimide components that may be used in the carrier composition of the present invention include, but are not limited to, methyl phthalimide, ethyl phthalimide, n-propyl phthalimide, isopropyl phthalimide, n-butyl phthalimide, sec-butyl phthalimide, N-ethyl phthalimide, N-isopropyl phthalimide, N-butyl phthalimide, N-isobutyl phthalimide, N-2-ethyl hexyl phthalimide, N-ethoxymethyl phthalimide, N-propoxymethyl phthalimide, and N-methyl carbonyl-N-methoxyl phthalimide. Preferred alkylphthalimide carrier compounds are those having alkyl groups of twelve or less carbon atoms. Strongly preferred are alkylphthalimides which are liquid at the temperature of use. The presently most preferred compounds are n-butyl phthalimide and isopropyl phthalimide, and preferred mixtures of alkylphthalimide carrier components include a mixture comprising a 3:1 weight ratio of n-butyl phthalimide to isopropyl phthalimide (a euthetic mixture).

"Clay dispersing agent" as used herein refers to any type of smectite clay, such as montmorillonite or Japan clay, including bentonite (sodium montmorillonite) or Fuller's earth (calcium montmorillonite) which is capable of performing a dispersing function for an insoluble, hydrophobic dye carrier in an aqueous medium. Suitable clays are those disclosed in U.S. Pat. Nos. 3,989,631, 4,178,254 and 4,844,821, or an organoclay as disclosed in U.S. Pat. No. 5,130,028. The disclosures of all of these patents are hereby incorporated herein by reference.

The clay component is smectite clay having the general characteristics as described in Kirk-Othmer Encyclopedia of Chemistry, Third Edition, 6:391–394 (1989) and *Ullmann's Chemical Encyclopedia*, A7:116–119, 124–125, and 131–133 (1994), the disclosures of both being incorporated herein by reference. The preferred clay is a bentonite clay, and more particularly, a sodium bentonite clay in the form of a free-flowing powder or agglomerate. The presently preferred bentonite has the following characteristics: the powder has a brightness on the Hunter Color Scale of L greater than 87; a cation exchange capacity of about 75 milliequivalents per 100 g; a particle size of about $0.2\mu$ to about 1.1 mm, preferably about $2\mu$ to about $10\mu$ (averaging about $4\mu$) as a powder and about 0.4 mm to about 1.1 mm as an agglomerate; a moisture content of 10±2% in powder form or 12±2% in agglomerate form; a swelling volume of at least about 18 ml, based on 2 g in 100 ml water; a pH (at a 2% suspension) of about 9 to about 11; a loose bulk density of 550±50 g/l in powder form and about 830±50 g/l in agglomerate form; with a powder residue on a $45\mu$ screen of a maximum of about 5%. The presently preferred bentonite has the following chemical analysis: $SiO_2$, about 70.0%; $Al_2O_3$, about 16.0%; MgO, about 2.7%; $Na_2O$, about 2.8%; $Fe_2O_3$, about 1.3%; $K_2O$, about 1.0%; CaO, about 1.1%; and about 5% loss on ignition. A preferred white sodium bentonite clay may be obtained from American Colloid Company, Arlington Heights, Ill., for example.

The carrier composition of the present invention is in the form of a stable substantially anhydrous composition of the carrier component and the clay dispersing agent. Minor or trace amounts of water may be included, particularly if other optional ingredients as noted below are present. Carrier compositions containing some water are acceptable, but those containing no or only trace amounts of water are more stable. The carrier composition comprises the carrier component, and preferably the alkylphthalimide carrier component, at a concentration of about 30 weight % (based on the total weight of the carrier composition) to about 90 weight % and the clay dispersing agent at a concentration of about 10 weight % to about 42 weight %, the balance including any optional components. Preferably, the carrier composition comprises the lower alkylphthalimide carrier component at a concentration of about 45 weight % to about 75 weight % and the clay dispersing agent at a concentration of about 25 weight % to about 35 weight %. More preferably, the carrier composition comprises the lower alkylphthalimide carrier component at a concentration of about 58 weight % to about 68 weight % and the clay dispersing agent at a concentration of about 31 weight % to about 34 weight %.

The carrier composition may also comprise other optional auxiliary components. Such optional auxiliaries include but are not limited to viscosity control agents and leveling agents. The viscosity control agent is preferred so that the composition is readily pourable or pumpable. The leveling agent is preferred to provide better, more uniform distribution of the dyes.

A preferred viscosity of the carrier composition is about 12,000 centipoise ("cp") to about 16,000 cp, and preferably about 14,000 cp, as measured by a Brookfield LVT viscometer at 12 rpm using a size 3 spindle.

Non-limiting examples of preferred viscosity control agents include ethoxylated linear or branched alcohols, such as tridecyl alcohol, with three moles of ethoxylation ("TDA 3"), tridecyl alcohol, with six moles of ethoxylation ("TDA 6"), and Nedol™ 9-3, available from Shell Chemicals, Inc., Houston, Tex., for example. When a viscosity control agent is used, it may be present in an amount of up to about 5 weight %, preferably about 1.5 weight % to about 4 weight %, and more preferably about 3.2 weight % to about 3.8 weight %. All of these weight percentages are based on the weight of the carrier composition.

Non-limiting examples of preferred leveling agents include ethoxylated oleic acid with 14 moles of ethoxylation ("mono oleate 14EO"), ethoxylated oleic acid with 12 moles of ethoxylation ("mono oleate 12EO") and ethoxylated oleic acid with 16 moles of ethoxylation ("mono oleate 16EO"). When a leveling agent is used, it may be present in an amount of up to about 5 weight %, preferably about 1 weight % to about 3 weight %, and more preferably about 1 weight % to about 1.2 weight %. All of these weight percentages are based on the weight of the carrier composition.

Other optional ingredients may also be included in the carrier composition of the present invention including, without limitation, wetting agents, biocides, antifoaming agents, and acids or bases to adjust the pH to an appropriate level, depending on the intended use with a particular disperse dye, for example.

The carrier composition of the present invention may be made readily using standard commercial equipment. A suitable general procedure is as follows, but many variations may be made, as long as the desired substantially uniform and smooth composition is achieved. The phthalimide or other dye carrier component is charged to a vessel, such as a Cowles mixer fitted with a shear blade. While mixing at low speed of about 100 to about 200 rpm, the clay is added to the phthalimide or other dye carrier component in the mixing vessel. The mixture is mixed at this low speed until the clay is wetted, which may take on the order of about 3 hours. When the clay is wetted, the mixer is switched to high speed shear mixing at about 3500 to about 4000 rpm. The mixture is mixed at high speed until a smooth, uniformly blended mixture is obtained. During high speed mixing, the mixture is preferably cooled to keep the temperature at about 55° to about 60° C. After a suitable period of time, such as about 2 to about 2.5 hours, and after achieving the desired smoothly blended mixture, the optional ingredients, such as the viscosity control agent and leveling agent are mixed, preferably at the high speed for another period of time until all ingredients are thoroughly blended, for example, for about 30 minutes. Following the uniform blending of all optional ingredients, the mixer preferably is run at low speed mixing to make it easier to cool the mixture to about 30° to about 35° C. The mixture is then discharged through a bag filter and placed in appropriate containers for storage or shipping.

The carrier composition of this invention is used in an aqueous dye bath for disperse dyeing of a hydrophobic textile also comprising a disperse dye and water. The carrier agent component of the carrier composition will not effectively be able to be separately mixed directly in the dye bath or water used for the dye bath, even if the clay dispersing agent is added later, without first making a premix of the carrrier composition in which the carrier is dispersed with a dispersing agent, in the case of the present invention, a clay dispersing agent as discussed above. It is also not possible to make a dye bath according to the present invention by first separately mixing in a dye bath or in the water used for the dye bath the clay dispersing agent of this invention, followed by the separate addition of the carrier material, because the carrier oil splits out as a separate oil phase. Nor is it possible to simultaneously, but separately add the carrier and the clay dispersing agent to the dye bath or water used for the dye bath, for the same reason. The carrier oil will adversely spot the textiles.

Rather than separately adding the carrier composition ingredients to the dye bath or the dye bath water, to make a dye bath according to the present invention, the carrier and clay dispersing agent must first be formed into the carrier composition of the invention. Then the carrier composition, per se, is added to the dye bath or water used to make the dye bath.

Clay/phthalimide carrier compositions of the present invention may be added to the aqueous dye bath in number of different ways, all of which result in satisfactory dispersibility of the carrier in the dye bath. For example, the carrier composition may be added directly to the water with strong mixing. However, optimal dispersibility of the carrier composition is achieved by predispersion of the carrier formulation in water as a concentrate. Predispersion may be done, for example, by placing the carrier formulation in a container and slowing adding water to the carrier formulation with vigorous mixing. The water is at a temperature of about 90° F. to about 120° F. and the mixing should be sufficient to keep the entire mixture turning. At a ratio of about 2 to about 3 parts water to 1 part of the clay/phthalimide carrier composition, the mixture will become an "inverse emulsion," with water as the internal phase. At this point, the mix will be very thick and have an almost paste-like consistency. At this stage, water addition is stopped and the mixing continues until the paste is smooth and completely free of lumps. When the mixture is smooth, the water addition is restarted and the water is slowly added with mixing until the concentrated dispersion of the carrier composition is pourable or pumpable. A preferred pourable or pumpable concentrate results when the ratio of water to carrier composition is about 10 to 1 or until the mixture is pourable. This concentrated predispersion mixture is then added to the dye bath in an amount to achieve the desired quantity of the carrier composition, calculated on a non-diluted basis, in the dye bath.

Use of this preferred method results in a dispersion that is very stable in the dye bath. If the dye bath is allowed to stand without agitation for a length of time that the clay/phthalimide carrier component settles as a fine powder, it is easily redispersed by mixing. Settling of clay/phthalimide carrier component does not result in irregular dyeing. Even in the extreme situation of the clay/phthalimide carrier component being deposited on the fabric in an undispersed or poorly dispersed form, there is no resulting irregularity in the uniformity of the dyeing and satisfactory dyeing results are achieved without spotting.

With traditional carrier formulations, satisfactory dyeing results are typically not achieved with poorly dispersed carrier formulations. Although traditional carrier formulations typically "bloom" into water well and easily form very uniform milky dispersions, they tend to cream to the top of a dye bath that is allowed to stand without agitation. This cream will deposit onto the fabric and cause dye-spots. Dye-spots will also form if the traditional carrier formulation is allowed to splatter onto the fabric in the undispersed form.

The invention also relates to a method of disperse dyeing to a predetermined extent a hydrophobic textile. The method comprises the steps of (a) providing a hydrophobic textile, (b) providing an aqueous dye bath comprising a disperse dye and dye carrier composition, the dye carrier composition comprising a dye carrier and a clay dispersing agent capable of dispersing the dye carrier in the dye bath and (c) contacting the textile with the dye bath until the hydrophobic textile is dyed to the predetermined extent.

The aqueous dye bath includes water and the desired disperse dye, the carrier composition according to the present invention and other desired additives, such as chelating agents, acids or bases to adjust the pH of the dye bath to the appropriate level based on the characteristics of the dye being used and the textile being dyed, as well as various other optional ingredients such as other wetting agents, antifoaming agents, and the like, well known to those skilled in the dyeing art.

Dyers typically refer to the amounts of ingredients in a dye bath based on the weight of the textile or fabric being dyed, rather than as amounts based on the total amount of ingredients in the dye bath, per se, without the fabric. The amount of dye and dye carrier will depend upon the shade and depth of color desired for a particular fabric, and therefore, when references are made to the amounts of dye and the carrier composition of the invention used in the dyeing method of the invention, the amount will be based on a percentage by weight of the textile or fabric being dyed, referred to as the "percentage on weight of the fabric" ("% owf").

The dye may be present in the dye bath in a concentration owf of about 0.001% to about 0.25% for pastels, about 0.25% to about 0.75% for light shades, about 0.75% to about 1.5% for medium shades and about 1.5% to at least about 3% for dark shades. The carrier composition will be present in the dye bath in a concentration owf of about 0.5% to about 20%, preferably about 1.5% to about 15%, and more preferably about 2% to about 10%.

Although the method of the present invention may be varied by the various dye houses to suit the particular needs of their customers, the method of the present invention generally comprises weighing the textile to be dyed and loading it into any of the several types of dyeing apparatus used throughout the industry, such as Theis Jet and atmospheric beck equipment. The vessel or bin containing the textile is then filled to an appropriate level with water and the textile is circulated in the water while the water is heated to the indicated dyeing temperature associated with the particular dispersed dye. While the textile is being circulated, chelate is added if desired to sequester any unwanted metal ions in the system and the appropriate pH adjustment is made, if necessary, often by adding the appropriate amount of acid, such as acetic acid, to obtain the desired pH. Next, the dye carrier composition of the present invention is added, preferably but not necessarily in a predispersed form as set forth above, while the circulation continues to achieve uniform distribution of the foregoing components throughout the textile. Disperse dyes, typically predispersed with and mixed with water, are then added to the dye bath containing the circulating textile. The temperature of the circulating dye bath and textile is then raised to the desired level and maintained until the dyes are exhausted or diffused into the fibers of the textile to the predetermined extent, depending upon the shade desired. The dye bath containing the dyed textile is then cooled to ambient temperature, at which point the dye bath is drained. The dyed textile is then rinsed, and if needed, scoured to remove any loose dyes. After the appropriate rinsing, the dyed textile is dried.

The present invention will now be described in more detail with reference to the following specific, non-limiting examples.

As used in Example 1, Table 1, the term "percent", "%" or the like, refers to the percent by weight of the particular ingredient or component to which the term refers, based on the weight of the composition, bath or other overall product of which the component forms a part, as should be clear from the context in which it is used, unless otherwise noted. In the other Tables of Example I and in the other following examples, the amounts of ingredients are stated as weight percents based on the weight of the textile or fabric being dyed (owf).

Most of the examples include an "ACS Yield" reading. This number is determined using an "Applied Color System" Spectro Sensor® II instrument, Model 1400 PC, from Applied Color Systems, Inc., Princeton, N.J., which measures depth of shade only, which is related to the amount of dye affixed to the fiber. The higher the ACS yield, the more dye is bonded to the fabric. This number does not reflect other factors which are also critical to color perception, such as cast (is it too red or too blue, etc.) and brightness (is it eye-catching or dull). Where the ACS Yield does not apply, alternate descriptions of the results are provided.

EXAMPLE 1

Example 1 is a demonstration that dispersing systems based on sodium bentonite clays are equally as effective as traditional organic dispersing systems, both non-ionic or anionic, in creating effective polyester dye carrier formulations.

Example 1, Table 1 provides the composition of all of the carrier formulations discussed in Example 1 and in the following examples. The dye carrier compositions identified in Example 1, Table 1 as F1915H, F1933P and F1960C are compositions according to the present invention. They were prepared using the ingredients of Table 1 and following the method set forth above concerning making and predispersing the carrier composition of the invention. The other CAROLID® and ECOLID® carriers (Sybron Chemicals Inc., Birmingham, N.J.) are commercially available dye carriers used for comparison purposes. Two of the carrier formulations, CAROLID® TOP and CAROLID® SFC employ the commonly used carrier compounds o-chloro toluene and biphenyl. The other five carrier formulations, CAROLID® NOL, ECOLID® STU, F1915H, F1933P, and F1960C, employ n-butyl and isopropyl phthalimide mixtures as the carrier compounds.

The experiment outlined in Example 1, Table 2 compares the clay dispersing system with a nonionic organic dispersing system, with phthalimide mixtures as the carrier compounds. Whether the carriers are present in the dye bath at either 6% or 8% owf, the yield is improved when the clay dispersant is used. Comparison of the two types of carrier dispersing systems indicated that the carrier tended to separate slowly to the surface when the organic dispersant was used and that the carrier remained in suspension or settled slightly, but was easily redispersed, when clay was used as the dispersant.

The F1915H and F1933P carrier compositions of the present invention included small amounts of water by virtue of their formulations using polyethylene glycol 14 monooleate (PEG 14 monooleate) in the form of a 30 weight % aqueous solution. F1960C used anhydrous PEG 14 monooleate. While all three compositions were acceptable with respect to stability and dyeing results, F1960C was the most stable and is preferred.

The experiments outlined in Example 1, Tables 3–5 compare the clay dispersing system with anionic organic dispersing systems, with phthalimide mixtures as the carrier compounds. A variety of dyeing temperatures, from 207° F. to 260° F., are indicated in these tables. In all of the experiments detailed in Tables 3–5, higher yields were obtained with a carrier formulation containing a clay dispersing system than with a carrier formulation containing an anionic organic dispersing system.

TABLE 1

Example 1
CARRIER FORMULATIONS

PERCENT IN COMPOSITION

|  | F1915H | F1933P | F1960C | Carolid ® NOL | Ecolid ® STU | Carolid ® TOP | Carolid ® SFC |
|---|---|---|---|---|---|---|---|
| Phthalimides[1] | 58.8 | 63.0 | 63.0 | 68.4 | 81.6 | | |
| Clay[2] | 29.4 | 30.9 | 32.4 | | | | |
| Water | | | | 8.5 | | | |
| PEG 14 Monooleate (30 wt % aqueous solution) | 11.8 | 3.6 | | | | | |
| PEG 14 Monooleate (anhydrous) | | | 1.1 | | | | |
| 3 Mole EO Tridecanol | | 2.5 | 3.5 | | | | |
| Nonionic/Anionic Emulsifiers | | | | 23.1 | | | 29.4 |
| Nonionic Emulsifiers | | | | | 18.4 | | |
| Anionic Emulsifiers | | | | | 5.6 | | |
| O-chloro-Toluene | | | | | | 69.3 | 48.3 |
| Biphenyl | | | | | | 25.1 | 22.3 |

[1]Phthalimides: eutectic mixture of n-butyl and isopropyl phthalimides (3:1 weight ratio)
[2]clay: sodium bentonite (bleaching clay) of approximately 2–10 microns particle size.

TABLE 2

Example 1
COMPARISON OF CLAY TO NONIONIC EMULSIFIER PACKAGE UNDER ATMOSPHERIC CONDITIONS Fabric: 100% Textured Woven Polyester
Liquor/Fabric Ratio: 20/1
Equipment: Ahiba AG, Model WBRG-7 Laboratory Dye Apparatus
Procedure:

1) Set temperature of dye bath at 120° F., with water and fabric only.
2) Add acetic acid to obtain a pH 5.5–6.0, Plexene ™ Extra Conc. and carrier.
3) Run 10 minutes.
4) Add dye.
5) Raise temperature 3° F./min. to 207–209° F. and run for 1 hour, then drain.
6) Rinse with hot water, drain and dry.

| Dye or auxiliary | Amounts, in % on the weight of the fabric (Run no.) | | | |
|---|---|---|---|---|
| | 24 | 25 | 26 | 27 |
| Disperse Red 60 | 4.0 | 4.0 | 4.0 | 4.0 |
| Acetic Acid 56% | 0.5 | 0.5 | 0.5 | 0.5 |
| Plexene ™ Extra Conc.[1] | 0.5 | 0.5 | 0.5 | 0.5 |
| F1915H | | | 6.0 | 8.0 |
| Ecolid STU | 6.0 | 8.0 | | |
| ACS Yield Reading | 100* | 103 | 107 | 106 |

[1]40% aqueous solution of EDTA tetrasodium salt available from Sybron Chemicals Inc.
*Standard

TABLE 3

Example 1
COMPARISON OF CLAY TO ANIONIC EMULSIFIER PACKAGE UNDER ATMOSPHERIC CONDITIONS Fabric: 100% Textured Woven Polyester
Liquor/Fabric Ratio: 20/1
Equipment: Ahiba AG, Model WBRG-7 Laboratory Dye Apparatus
Procedure: See Example 1; Table 2

| Dye or auxiliary | Amounts, in % on the weight of the fabric (Run no.) | | | | | |
|---|---|---|---|---|---|---|
| | 43 | 46 | 44 | 47 | 45 | 48 |
| Resolin Blue FBL | 0.35 | 0.35 | 0.35 | 0.35 | 0.35 | 0.35 |
| Resolin Red FB 200% | 0.25 | 0.25 | 0.25 | 0.25 | 0.25 | 0.25 |
| Terasil Yellow 2GW | 1.0 | 1.0 | 1.0 | 1.0 | 1.0 | 1.0 |
| Acetic Acid 56% | 0.5 | 0.5 | 0.5 | 0.5 | 0.5 | 0.5 |
| Plexene ™ Extra Conc | 0.25 | 0.25 | 0.25 | 0.25 | 0.25 | 0.25 |
| F1933P | 4.0 | | 5.0 | | 6.0 | |
| Carolid ® NOL | | 4.0 | | 5.0 | | 6.0 |
| ACS Yield Reading | 100* | 90 | 104 | 93 | 106 | 91 |

*Standard

TABLE 4

Example 1
COMPARISON OF CLAY TO ANIONIC EMULSIFIER PACKAGE
AT INTERMEDIATE TEMPERATURE AND MODERATE PRESSURE Fabric: 100% Textured Woven Polyester
Liquor/Fabric Ratio: 10/1
Equipment: Laboratory Launderometer
Procedure:

1)–4) See Procedure, Example 1, Table 2, Steps 1–4.
5) Seal the vessel and raise temperature 3° F./min. to 217° F.
6) Run 45 minutes, then drain.
7) Rinse with hot water, drain and dry.

| Dye or auxiliary | Amounts, in % on the weight of the fabric (Run no.) | | | | | | | |
|---|---|---|---|---|---|---|---|---|
| | 3 | 6 | 12 | 15 | 1 | 4 | 10 | 13 |
| Intrasil Yellow 2GW | 1.0 | 1.0 | 1.0 | 1.0 | 0.17 | 0.17 | 0.17 | 0.17 |
| Intrasil Scarlet 2RV | 0.1 | 0.1 | 0.1 | 0.1 | | | | |
| Intrasperse Red GFL | | | | | 2.50 | 2.50 | 2.50 | 2.55 |
| Terasil Blue R 200% | 1.1 | 1.1 | 1.1 | 1.1 | 0.33 | 0.33 | 0.33 | 0.33 |
| Acetic acid 56% | 0.5 | 0.5 | 0.5 | 0.5 | 0.5 | 0.5 | 0.5 | 0.5 |
| Plexene ™ Extra Conc. | 0.25 | 0.25 | 0.25 | 0.25 | 0.25 | 0.25 | 0.25 | 0.25 |
| F1933P | 4 | | 6 | | 4 | | 6 | |
| Carolid ® NOL | | 4 | | 6 | | 4 | | 6 |
| ACS Yield Reading | 98 | 95 | 100* | 100 | 101 | 101 | 100 | 96 |

*Standard

TABLE 5

Example 1
COMPARISON OF CLAY TO ANIONIC EMULSIFIER PACKAGE
UNDER ATMOSPHERIC CONDITIONS Fabric: 100% Textured Woven Polyester
Liquor/Fabric Ratio: 20/1
Equipment: Ahiba AG, Model WBRG-7 Laboratory Dye Apparatus
Procedure: See Example 1, Table 2

| Dye or auxiliary | Amounts, in % on the weight of the fabric (Run no.) | | | | | | | |
|---|---|---|---|---|---|---|---|---|
| | 19 | 21 | 20 | 22 | 25 | 27 | 26 | 28 |
| Resolin Red FB 200% | | | | | 2.0 | 2.0 | 2.0 | 2.0 |
| Terasil Yellow 2GW | 3.0 | 3.0 | 3.0 | 3.0 | | | | |
| 56% Acetic Acid | 0.5 | 0.5 | 0.5 | 0.5 | 0.5 | 0.5 | 0.5 | 0.5 |
| Plexene ™ Extra Conc. | 0.25 | 0.25 | 0.25 | 0.25 | 0.25 | 0.25 | 0.25 | 0.25 |
| F1933P | 6.0 | | 8.0 | | 6.0 | | 8.0 | |
| Carolid ® NOL | | 6.0 | | 8.0 | | 6.0 | | 8.0 |
| ACS Yield Reading | 93 | 89 | 100* | 91 | 89 | 84 | 100 | 88 |

*Standard

EXAMPLE 2

Example 2 is a demonstration that the use of clay as a dispersant in carrier formulations allows for the use of non-hazardous carrier formulations in lieu of commonly used hazardous carrier formulations, with comparable results in dye yield.

The commercially available Carolid® TOP product (as described in Example 1; Table 1) contains both monochlorotoluene and biphenyl as carrier agents and provides in Example 2, Table 1, the following health information on the Material Safety Data Sheet:

TABLE 1

| | Example 2 | | |
|---|---|---|---|
| CAS NO. | compound | OSHA PEL[1] | ACGIH CEILING[2] |
| 25168-05-2 | monochlorotoluene, mixed isomers | 50 ppm | 50 ppm |
| 92-52-4 | biphenyl | 0.2 ppm | 0.2 ppm |

[1]PEL = Permissable Exposure Levels
[2]ACG/H = American Conference of Government Industrial Hygiensts.

A material data sheet written for the commercial carrier formulations Carolid® NOL or Ecolid® STU, or for the carrier formulations of the present invention designated F1933P, F1915H, or F1960C, all of which employ a phthalimide mixture as the carrier agent, would not be required to report warnings because of the nontoxic nature of the phthalimides. In addition to presenting potential health concerns, compositions containing a mixture of chlorotoluenes and biphenyls have a strong objectionable odor that can permeate throughout a manufacturing facility and linger for long periods. Use of carrier compositions containing phthalimide carrier compounds does not result in the production of objectionable odors.

From an environmental standpoint, use of carrier formulations containing phthalimide compounds would also be preferable. Note the BOD/COD information and the volatile organic contents information shown in Example 2, Table 2, below.

TABLE 2

| | Example 2 | | |
|---|---|---|---|
| | BOD[1] | COD[2] | VOC[3] |
| Carolid ® TOP (chlorotoluene; biphenyl) | — | 2,300,000 ppm | 95% |
| Ecolid ® STU (phthalimides/ organic emulsifiers) | 137,000 ppm | 1,754,000 ppm | 38% |

TABLE 2-continued

| | Example 2 | | |
|---|---|---|---|
| | BOD[1] | COD[2] | VOC[3] |
| F1933P (phthalimides/ clay emulsifiers) | 82,000 ppm | 1,555,000 ppm | 20% |

[1]BOD = biological oxygen demand
[2]COD = chemical oxygen demand
[3]VOC = volatile organic contents Example 2, Tables 3–6 show comparisons in dyeing performance between F1933P, which contains phthalimide carrier compounds formulated with a clay dispersant according to the present invention, and Carolid® TOP, which contains chlorotoluene and biphenyl compounds formulated with organic emulsifiers. Comparisons were made at a variety of dyeing temperatures, ranging from 207° F. to 260° F., and with a variety of dye combinations. In each case, the dye yield obtained using the non-hazardous F1933P carrier formulation was equal to or superior to the dye yield obtained with the more hazardous Carolid® TOP carrier formulation. Additionally, and importantly, the dispersibility of the F1933P carrier formulation was equal to that of the chlorotoluene organic carrier formulation.

TABLE 3

Example 2
PHTHALIMIDE/CLAY CARRIER FORMULATIONS
MATCH THE PERFORMANCE OF A HAZARDOUS CARRIER
FORMULATION AT INTERMEDIATE TEMPERATURES
AND MODERATE PRESSURES Fabric: 100% Textured Woven Polyester
Liquor/Fabric Ratio: 10/1
Equipment: Laboratory Launderometer
Procedure: See Example 1, Table 4

| Dye or auxiliary | Amounts, in % on the weight of the fabric (Run no.) | | | | | | | |
|---|---|---|---|---|---|---|---|---|
| | 3 | 9 | 12 | 18 | 1 | 7 | 10 | 16 |
| Intrasil Yellow 2GW | 1.0 | 1.0 | 1.0 | 1.0 | 0.17 | 0.17 | 0.17 | 0.17 |
| Intrasil Scarlet 2RV | 0.1 | 0.1 | 0.1 | 0.1 | | | | |
| Intrasperse Red GFL | | | | | 2.50 | 2.50 | 2.50 | 2.50 |
| Terasil Blue R 200% | 1.1 | 1.1 | 1.1 | 1.1 | 0.33 | 0.33 | 0.33 | 0.33 |
| Acetic acid 56% | 0.5 | 0.5 | 0.5 | 0.5 | 0.5 | 0.5 | 0.5 | 0.5 |
| Plexene ™ Extra Conc. | 0.25 | 0.25 | 0.25 | 0.25 | 0.25 | 0.25 | 0.25 | 0.25 |
| F1933P | 4 | | 6 | | 4 | | 6 | |
| Carolid ® TOP | | 4 | | 6 | | 4 | | 6 |
| ACS Yield Reading | 98 | 91 | 100* | 101 | 101 | 103 | 100* | 100 |

*Standards

TABLE 4

Example 2
UTILITY OF CLAY IN MAKING INNOCUOUS CARRIER FORMULATION MATCHES THE PERFORMANCE OF HAZARDOUS FORMULATIONS AT HIGH TEMPERATURE Fabric: 100% Textured Woven Polyester
Liquor/Fabric Ratio: 10/1
Equipment: Laboratory Launderometer
Procedure:

1)–4) See Example 1, Table 2, Steps 1–4.
5) Seal vessel and raise temperature 3° F./min. to 260° F.
6) Run 30 minutes, then drain.
7) Rinse with hot water, drain and dry.

| Dye or auxiliary | Amounts, in % on the weight of the fabric (Run no.) | | | |
|---|---|---|---|---|
| | 7 | 5 | 8 | 6 |
| Foron Navy 2GL 100% | 3.0 | 3.0 | 3.0 | 3.0 |
| Acetic Acid 56% | 0.5 | 0.5 | 0.5 | 0.5 |
| Plexene ™ Extra Conc. | 0.25 | 0.25 | 0.25 | 0.25 |
| F1933P | 2 | | 4 | |
| Carolid ® TOP | | 2 | | 4 |
| ACS Yield Reading | 100 | 100* | 102 | 97 |

*Standard

TABLE 5

Example 2
UTILITY OF CLAY IN MAKING INNOCUOUS CARRIER MATCH THE PERFORMANCE OF HAZARDOUS CARRIER Fabric: 100% Textured Woven Polyester
Liquor/Fabric Ratio: 20/1
Equipment: Ahiba AG, Model WBRG-7 Laboratory Dye Apparatus
Procedure: See Example 1, Table 2.

| Dye or auxiliary | Amounts, in % on the weight of the fabric (Run no.) | | | | | |
|---|---|---|---|---|---|---|
| | 43 | 49 | 44 | 50 | 45 | 51 |
| Resolin Blue FBL | 0.35 | 0.35 | 0.35 | 0.35 | 0.35 | 0.35 |
| Resolin Red FB 200% | 0.25 | 0.25 | 0.25 | 0.25 | 0.25 | 0.25 |
| Terasil Yellow 2GW | 1.0 | 1.0 | 1.0 | 1.0 | 1.0 | 1.0 |
| Acetic Acid 56% | 0.5 | 0.5 | 0.5 | 0.5 | 0.5 | 0.5 |
| Plexene ™ Extra Conc. | 0.25 | 0.25 | 0.25 | 0.25 | 0.25 | 0.25 |
| F1933P | 4.0 | | 5.0 | | 6.0 | |
| Carolid ® TOP | | 4.0 | | 5.0 | | 6.0 |
| ACS Yield Reading | 100* | 96 | 104 | 98 | 106 | 95 |

*Standard

TABLE 6

Example 2
UTILITY OF CLAY IN MAKING INNOCUOUS CARRIER FORMULATIONS MATCHES THE PERFORMANCE OF HAZARDOUS FORMULATIONS UNDER ATMOSPHERIC CONDITIONS Fabric: 100% Textured Woven Polyester
Liquor/Fabric Ratio: 20/1
Equipment: Ahiba AG, Model WBRG-7 Laboratory Dye Apparatus
Procedure: See Example 1, Table 2.

| Dye or auxiliary | Amounts, in % on the weight of the fabric (Run no.) | | | | | | | |
|---|---|---|---|---|---|---|---|---|
| | 19 | 23 | 20 | 24 | 25 | 29 | 26 | 30 |
| Resolin Red FB 200% | | | | | 2.0 | 2.0 | 2.0 | 2.0 |
| Terasil Yellow 2GW | 3.0 | 3.0 | 3.0 | 3.0 | | | | |
| 56% Acetic Acid | 0.5 | 0.5 | 0.5 | 0.5 | 0.5 | 0.5 | 0.5 | 0.5 |
| Plexene ™ Extra Conc. | 0.25 | 0.25 | 0.25 | 0.25 | 0.25 | 0.25 | 0.25 | 0.25 |
| F1933P | 6.0 | | 8.0 | | 6.0 | | 8.0 | |
| Carolid ® TOP | | 6.0 | | 8.0 | | 6.0 | | 8.0 |
| ACS Yield Reading | 93 | 91 | 100* | 96 | 89 | 77 | 100* | 89 |

*Standards

EXAMPLE 3

Example 3 demonstrates that the use of a carrier formulation containing clay as the dispersing agent and a phthalimide mixture as the carrier equals the performance of current standard carrier formulations with regard to "cross-staining".

Cross-staining is a phenomenon that occurs when cellulosic yarns and polyester yarns are woven into a fabric at right angles to each other. For example, polyester yarn may be used in the warp direction and cellulosic yarn may be used in the filling direction. This construction is used when particular types of stripes are desired the final fabric. Traditionally, the fabric is dyed in two stages, wherein the fabric is first treated to dye one type of fiber and is then treated to dye the second type of fiber.

Recently, cross-staining has become much more of an issue in the industry. It is becoming popular to dye the polyester and the cotton fibers of the fabric in a single-bath, two-step process. The single-bath, two step process saves time and energy costs, but precludes the elimination of cross-stains. Therefore, cross-staining will interfere with the dyeing of the cotton portion and will make achieving the correct shade on the cotton fibers very difficult. Therefore, it is critical that a dye carrier formulation for polyester dyeing not contribute more to the cross-staining phenomenon.

The experiment outlined in Example 3, Table 1 demonstrates that cross-staining occurred with all of the carrier formulations. The experiment also demonstrated that the cross-staining that occurred with the clay/phthalimide carrier formulation was equivalent to the cross-staining that occurred with standard carrier formulations, which is an acceptable level of cross-staining according to industry standards.

TABLE 1

Example 3

Fabric: 50% Polyester/50% Cotton
Liquor/Fabric Ratio: 20/1
Equipment: Ahiba AG, Model WBRG-7 Laboratory Dye Apparatus
Procedure: (Dye only the polyester portion,
then observe the staining on the cotton)
See Example 1, Table 2.

| Dye or auxiliary | Amounts, in % on the weight of the fabric (Run no.) | | | | |
|---|---|---|---|---|---|
| | 1 | 2 | 3 | 4 | 5 |
| Terasil Yellow 2GW | 0.75 | 0.75 | 0.75 | 0.75 | 0.75 |
| Resolin Red FB 200% | 0.19 | 0.19 | 0.19 | 0.19 | 0.19 |
| Resolin Blue FBL | 0.26 | 0.26 | 0.26 | 0.26 | 0.26 |
| 56% Acetic Acid | 0.5 | 0.5 | 0.5 | 0.5 | 0.5 |
| Plexene ™ Extra Conc. | 0.25 | 0.25 | 0.25 | 0.25 | 0.25 |
| F1933P | 3 | | | | |
| Carolid ® NOL | | 3 | | | |
| Carolid ® TOP | | | 3 | | |
| Carolid ® SFC | | | | 3 | 4 |
| Ratings* | 2–3 | 2–3 | 2–3 | 2 | 2 |

*AATCC Grey-Scale Ratings for Evaluating Staining
Rating 1 - Heavy Staining
Rating 5 - Very light or no stain It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A carrier composition for use in disperse dyeing of a hydrophobic textile, the carrier composition comprising an alkylphthalimide carrier component and a clay dispersing agent wherein the alkylphthalimide carrier component is present in an amount of about 30 weight % to about 90 weight % and the clay dispersing agent is present in an amount of about 10 weight % to about 42 weight %.

2. The carrier composition according to claim 1, wherein the clay dispersing agent comprises bentonite.

3. The carrier composition according to claim 1 further comprising a viscosity control agent in an amount of up to about 5 weight % and a leveling agent in an amount of up to about 5 weight %.

4. The carrier composition according to claim 1, wherein the alkylphthalimide carrier component is present in an amount of about 45 weight % to about 75 weight % and the clay dispersing agent is present in an amount of about 25 weight % to about 35 weight %.

5. The carrier composition according to claim 4 further comprising a viscosity control agent in an amount of about 1.5 weight % to about 4 weight % and a leveling agent in an amount of about 1 weight % to about 3 weight %.

6. The carrier composition according to claim 1, wherein the alkylphthalimide carrier component is present in an amount of about 58 weight % to about 68 weight % and the clay dispersing agent is present in an amount of about 31 weight % to about 34 weight %.

7. The carrier composition according to claim 6 further comprising a viscosity control agent in an amount of about 3.2 weight % to about 3.8 weight % and a leveling agent in an amount of about 1 weight % to about 1.2 weight %.

8. A method of disperse dyeing a hydrophobic textile, the method comprising:
(a) providing a hydrophobic textile,
(b) providing an aqueous dye bath comprising a disperse dye and a dye carrier composition, the dye carrier composition comprising a dye carrier and a clay dispersing agent capable of dispersing the dye carrier in the dye bath, wherein the dye carrier comprises an alkylphtalimide carrier component, and
(c) contacting the textile with the dye bath until the hydrophobic textile is dyed.

9. The method according to claim 8, wherein the hydrophobic textile material comprises polyester.

10. The method according to claim 8, wherein the clay dispersing agent comprises bentonite.

11. The method according to claim 8, wherein the carrier composition is present in an amount of about 0.5 weight % to about 20 weight %, based on the weight of the textile.

12. The method according to claim 11, wherein the alkylphthalimide dye carrier component is present in an amount of about 30 weight % to about 90 weight % based on the weight of the carrier composition and wherein the clay dispersing agent is present in an amount of about 10 weight % to about 42 weight % based on the weight of the carrier composition.

13. The method according to claim 12, wherein the carrier composition further comprises a viscosity control agent in an amount of up to about 5 weight % based on the weight of the carrier composition, and a leveling agent in an amount of up to about 5 weight % based on the weight of the carrier composition.

14. The method according to claim 8, wherein the carrier composition is present in an amount of about 1.5 weight % to about 15 weight %, based on the weight of the textile.

15. The method according to claim 16, wherein the alkylphthalimide dye carrier component is present in an amount of about 45 weight % to about 75 weight % based on the weight of the carrier composition, and wherein the clay dispersing agent is present in an amount of about 25 weight % to about 35 weight %, based on the weight of the carrier composition.

16. The method according to claim 15, wherein the carrier composition further comprises a viscosity control agent in an amount of about 1.5 weight % to about 4 weight % based on the weight of the carrier composition, and a leveling agent in an amount of about 1 weight % to about 3 weight % based on the weight of the carrier composition.

17. The method according to claim 8, wherein the clay dispersing agent is present in an amount of about 2 weight % to about 10 weight %, based on the weight of the textile.

18. The aqueous dye bath according to claim 17, wherein the alkylphthalimide dye carrier component is present in an amount of about 58 weight % to about 68 weight % based on the weight of the carrier composition, and wherein the clay dispersing agent is present in an amount of about 31 weight % to about 34 weight % based on the weight of the carrier composition.

19. The method according to claim 18, wherein the carrier composition further comprises a viscosity control agent in an amount of about 3.2 weight % to about 3.8 weight % based on the weight of the carrier composition, and a leveling agent in an amount of about 1 weight % to about 1.2 weight % based on the weight of the carrier composition.

* * * * *